(12) United States Patent
Westrick

(10) Patent No.: US 7,165,264 B1
(45) Date of Patent: Jan. 16, 2007

(54) CLIENT-SIDE TOOL FOR SPLITTING OR TRUNCATING TEXT STRINGS FOR INTERACTIVE TELEVISION

(75) Inventor: Kelley A. Westrick, Seattle, WA (US)

(73) Assignee: Digeo, Inc., Kirkland, WA (US)

( * ) Notice: Subject to any disclaimer, the term of this patent is extended or adjusted under 35 U.S.C. 154(b) by 1162 days.

(21) Appl. No.: 09/956,754

(22) Filed: Sep. 19, 2001

Related U.S. Application Data

(60) Provisional application No. 60/308,550, filed on Jul. 26, 2001.

(51) Int. Cl.
*G06F 3/00* (2006.01)
*G06F 17/21* (2006.01)
*H04N 7/16* (2006.01)
*H04N 5/445* (2006.01)
*G06T 11/00* (2006.01)

(52) U.S. Cl. .................. 725/40; 725/137; 725/139; 348/563; 348/564; 715/508; 715/517; 715/526; 345/470

(58) Field of Classification Search ............ 725/40, 725/43, 47, 137, 139, 32; 348/468, 563, 348/564; 715/508, 517, 526; 345/470, 471, 345/472, 472.1, 472.2
See application file for complete search history.

(56) References Cited

U.S. PATENT DOCUMENTS

| | | | | |
|---|---|---|---|---|
| 5,822,123 A | * | 10/1998 | Davis et al. | 725/43 |
| 6,097,442 A | * | 8/2000 | Rumreich et al. | 348/563 |
| 6,452,597 B1 | * | 9/2002 | Goldberg et al. | 345/472 |
| 6,539,117 B1 | * | 3/2003 | Carau, Sr. | 382/229 |

\* cited by examiner

*Primary Examiner*—Chris Kelley
*Assistant Examiner*—Joseph G. Ustaris
(74) *Attorney, Agent, or Firm*—Darby & Darby PC; Bruce E. Black

(57) ABSTRACT

A tool usable in an interactive television environment comprises a module having code to analyze a dynamic text string and to determine where to split or truncate the text string, at spaces, for each row and/or into substrings for each page. The module takes onto account the pixel width of the characters in the text string and the available rows of the display area of the television to write the text string. The module can truncate the text string after a particular number of lines at a space and append an ellipsis, or the module can dynamically write code to accommodate the entire text string in a "page flipper," where the user sees substrings of the text string on each page (broken at a space at the end of each page) and can "page" forward or backward through the entire text string.

27 Claims, 8 Drawing Sheets

100 { THIS IS A TEXT STRING TO SHOW TRUNCATION AS PERFORMED USING CURRENT TECHNIQUES.

400 { THIS IS A TEXT STRING TO SHOW HOW
TRUNCATION IS PERFORMED
USING AN EMBODIMENT OF THE INVENTION.

CLIENT-SIDE TOOL FOR SPLITTING OR TRUNCATING TEXT STRINGS FOR INTERACTIVE TELEVISION

CROSS-REFERENCE TO RELATED APPLICATION

The present application claims the benefit of U.S. Provisional Patent Application Ser. No. 60/308,550, entitled "CLIENT-SIDE TOOL FOR SPLITTING OR TRUNCATING TEXT STRINGS FOR INTERACTIVE TELEVISION," filed Jul. 26, 2001, and incorporated herein by reference in its entirety.

TECHNICAL FIELD

This disclosure relates generally to the display of information, and in particular but not exclusively, relates to a tool to split or truncate displayed text strings in an interactive television environment.

BACKGROUND

Televisions and Internet technologies are beginning to converge. For example, the Internet is gaining television like qualities, such as the capability to play videos and music, and to broadcast live video feeds, and televisions are becoming more interactive like the Internet. In particular, access to the World Wide Web (or simply the "web") via Internet-enabled television systems (e.g., interactive television) is progressing and becoming more popular. Typically, such television systems allow users to access both web content information and television content via a television equipped with a set top box having browser software, although some types of advanced televisions and client terminals have built-in interactive capability, without the need for a separate set top box.

Internet web sites (or web servers) or other content providers often provide dynamic, as opposed to static, content on a web page that is to be rendered for display on a client terminal. An example of dynamic content is a text string that changes on a displayed web page or is rendered, while other content on the web page remain static. This dynamic text string creates an appealing experience to viewers, and is often used for items such as breaking news, weather updates, sports scores, or other content that changes frequently.

Various techniques are available to provide dynamic content on a web page. The dynamic content may be provided by way of a feed or an entry tool. Code written in a scripting language (such as Java Script™) can be included with the hypertext markup language (HTML) code of a web page or called as a function. For instance, an applet is a program that can be attached to an HTML document in order to write dynamic content.

When a traditional computer, such as a personal computer (PC), is used to access the Internet and to display dynamic web page content, the length of dynamically written text is not of great concern. This is because most browser user interfaces (UIs) provide scrolling controls, typically in the form of "scroll bars." Therefore, if the length of the dynamic text string is larger than what can be accommodated at one time in the UI display area of the PC, the scroll bars can be used to view portions of the text string that are otherwise obscured.

In some instances, back-end preview tools are used so as to reduce or eliminate the need for scroll bars at the client terminal. Such preview tools are used to manage content by making sure that text is composed to fit inside a predetermined area, and often involves human editorial contact with the text output before the text "goes live" on the Internet (e.g., the text pages are previewed every time content is to be updated and then placed on a web server for subsequent access by browsers). This is time-consuming and inefficient.

Interactive television systems typically do not have the benefit of scroll bars of PCs. Instead, dynamic text strings often need to be broken (e.g., truncated or split) so as to fit the display area of a television. FIGS. 1–2 illustrate this truncation in greater detail for a sample dynamic text string 100. It should be noted here that while the text string 100 is shown in FIG. 1 as being broken into 3 separate lines of text, the text string 100 is, in general, a continuous unbroken string (unless, of course, hard carriage returns comprise part of the text string)—the breaks in the text string 100 in FIG. 1 are only for purposes of allowing the text string 100 to fit within the margins of that page in this patent application.

FIG. 2 shows a portion of the text string 100 rendered on a television 200. Because the entire length of the text string 100 cannot fit within the confines of a display area 202 of the television 200, the text string 100 is truncated after the letter S in "STRING," and an ellipsis 204 is appended at that location. If the viewer wishes to see the next portion of the text string 100 that fits within the display area 202, then the viewer can click on a MORE button 206. A feature to use the MORE button 206 to move to the next page to view additional portions (e.g., substrings) of the text string 100 is sometimes referred to as a "page flipper."

As can be seen in FIG. 2, truncation of the word "STRING" results in an unpleasant viewer experience since viewers prefer to see entire words rather than portions of words, so that they do not have to guess what the word is. Moreover, current truncation techniques often do not have the ability to determine how much text can fit lengthwise in a row/line in the display area 202. To address this problem, character counts have been tried, where a character count is fixed based on a conservative estimate of how many characters can fit on one line of the display area 202. Then, the text string is broken when the character count is reached on each line of the display area 202. Thus, a conservative estimate would be based on a situation where all of the characters to be displayed in a single line of the display area 202 comprise characters having wide pixel widths (such as the letter "m" versus the letter "i").

The problem with such character count techniques is that they are not consistent. Using a fixed character count based on a conservative estimate cannot take into account the vast difference in pixel widths between the various characters in a typical text string. As a result, the character count causes large tracts of empty space (or "real estate") on the display area 202 that could have been used for additional characters from the text string. The large tracts of empty space are also visually unappealing to a viewer and looks like a "bug." And of course, character count techniques and other current truncation techniques cannot ensure that the truncation would occur at a visually pleasant and convenient "space" in a text string.

Therefore, improvements are needed in techniques to display information in an interactive television environment.

BRIEF DESCRIPTION OF THE DRAWINGS

Non-limiting and non-exhaustive embodiments of the present invention are described with reference to the fol

DETAILED DESCRIPTION OF THE ILLUSTRATED EMBODIMENTS

Figures 1, 2:
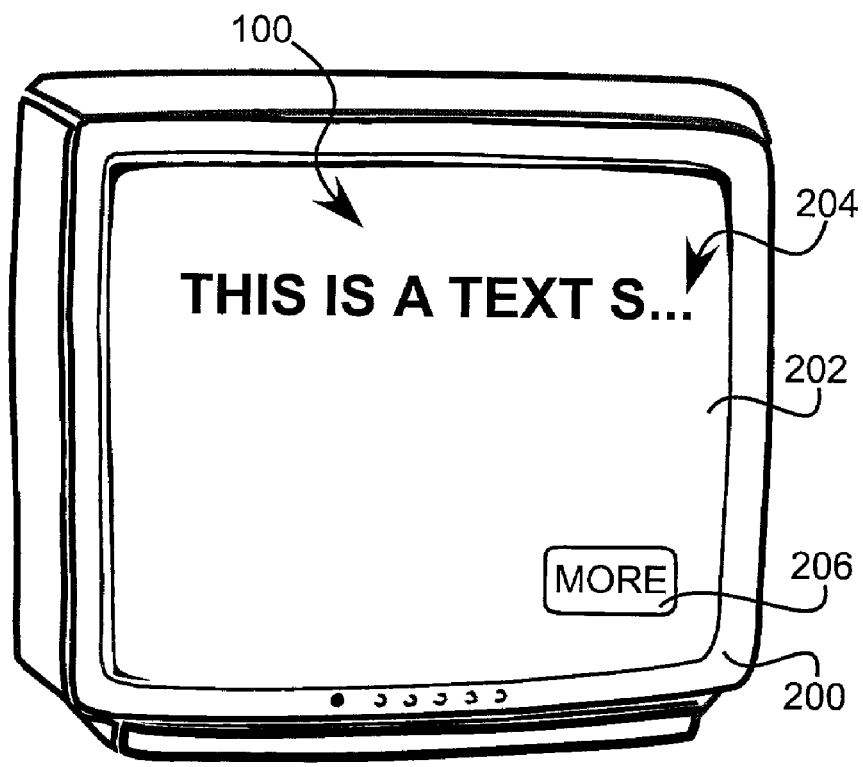
- FIG. 1 is an example dynamic text string.
FIG. 2 illustrates truncation of the dynamic text string of FIG. 1 in an interactive television system.

Embodiments of a technique for splitting or truncating text that is to be displayed in an interactive television environment are described herein. Throughout this specification, the terms "splitting" and "truncating" (or similar terms) are used interchangeably to indicate situations such as the breaking of a text string at a space at an end of each row or the breaking of a text string at an end of a "container" (e.g., at a last row, as described below).

In the following description, numerous specific details are provided, such as example JavaScript™ code, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, to avoid page scrolling on a television, such as when text strings are dynamic (e.g., from a feed or entry tool where the text changes), an embodiment of the invention provides a module that takes onto account the pixel width and line numbers of the available display area of the television to write the text. The entry tool can comprise a Content Management Tool or System (CMS) that provides a data entry point for text and other information to be displayed. The CMS "publishes" the content to the web browser when a page is requested. The module can truncate text after a particular number of lines at a space and append ellipses, or the module can dynamically write code (such as HTML code) to accommodate the entire string in a "page flipper," where the user sees substrings of text on each page (broken at a space at the end of each page) and can "page" forward or backward through the entire string.

Accordingly, an embodiment of the invention addresses the problems described above by splitting or truncating oversized text strings at a space, based on factors including pixel width and line length. That is, one embodiment of the invention addresses the problem of having a fixed UI display area (referred to herein as a "container" or the portion of a display area of a television that is dedicated to displaying text and other content) and no way to preview or predict what substring of a particular text string will fit into the container and in the font specified by client-side code. An embodiment of the module provides code that allows the creation of a page template with fixed containers that can accept dynamically fed text and split the text into substrings at spaces for display on the client-side. This eliminates the need to either preview text pages every time content is updated, or to break strings based on a character count. Therefore, an embodiment of the invention provides a good user experience since strings are broken at spaces between words rather than within words.

A metaphor to illustrate operation of the code of an embodiment of the invention is a manual typewriter. The code goes through text until a "ding" signifying the end of a line (e.g., the aggregated values of each character's pixel width has exceeded the width of the container) sounds. Then, a subroutine or function is called to check the offending character to see if that character is a space, and if it is not a space, then the subroutine searches back through each character until the most recent space is found. Next, the code will increment the row number (e.g., to verify whether the last line/row in the container has been reached), and passes an index (corresponding to the offending character after the space) back into the loop of the subroutine to allow the offending character to be continued as the first character in that next row, if the last row in the container has not been reached.

If the code is truncating the text, the code checks each time inside the row counter to see if the row counter has reached the last line. If it has reached the last line, the code decrements the value corresponding to the width of the container to allow sufficient space for an ellipsis. In an embodiment where the code is splitting the text string into substrings to go into a page flipper, the code creates page objects with the substring that fits inside each container as a property of the page object: an array named Page( ), for instance. Then, HTML code is dynamically written to accommodate as many containers as the number of pages that are used/counted.

Figure 3:
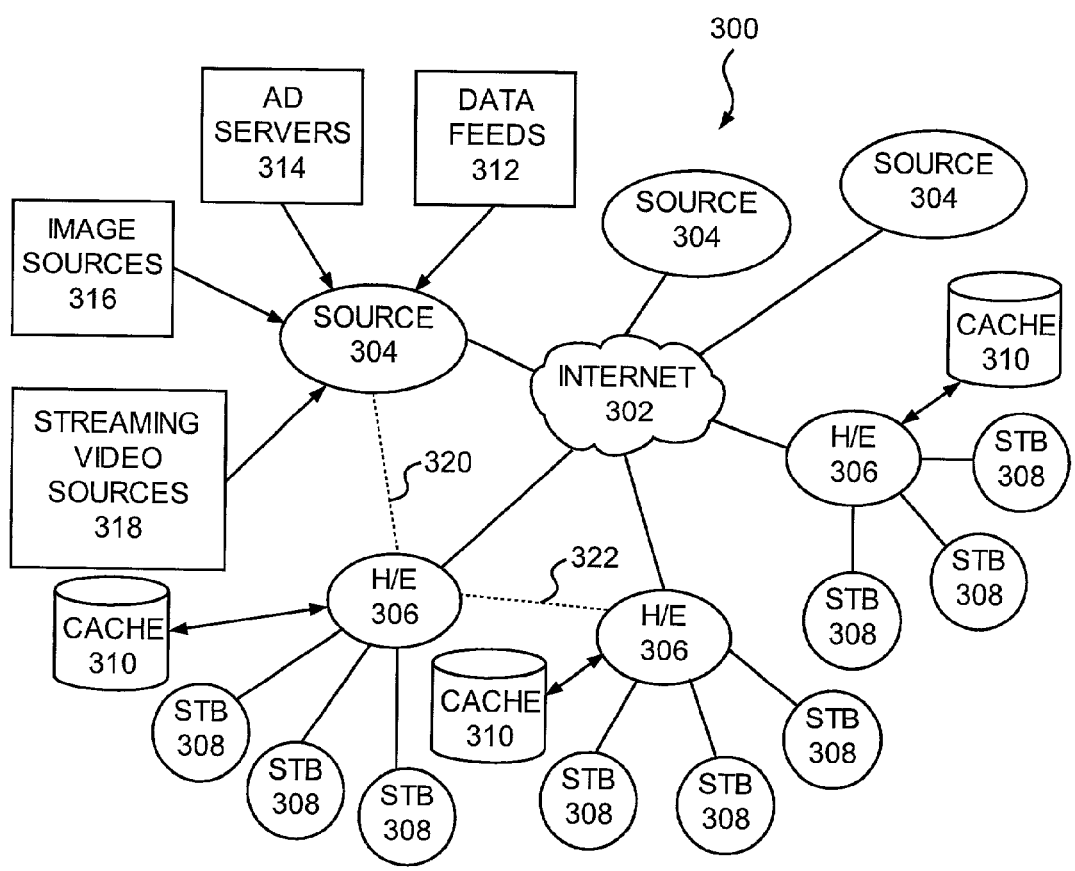
FIG. 3 is a block diagram of an interactive television system that can implement an embodiment of the invention.

FIG. 3 shows an example of an interactive video casting system 300 for distributing Internet content in addition to television content. The interactive video casting system 300 can comprise an interactive television system, as one example of a system that can implement an embodiment of the invention to split or truncate text strings.

In accordance with an embodiment of the present invention, the system 300 can be integrated with a cable television distribution system. The system 300 includes an Internet 302, a plurality of content sources 304, a plurality of distribution centers or broadcast centers (depicted as head-ends or H/Es 306), and a plurality of client terminals 308 (depicted as set top boxes). In addition, a content source 304 is depicted as receiving data from data feeds 312, advertisement servers 314, image sources 316, and streaming video sources 318.

The plurality of content sources 304 is coupled to the Internet 302. For example, a content source 304 may comprise a web site portal such as Go2Net.com, or a news web site such as CNN.com, or other types of sources, including web servers and the web content (such as web pages) stored in the web servers. Each content source 304 may have various data feeds 312, servers 314, and sources 316/318 coupled to it.

For example, news or stock quote feeds 312 may be fed into the content source 304. Servers 314 may provide advertisements for insertion into multimedia content delivered by the content source 304. Sources 316/318 may provide images 316, streaming video 318, and other content to the content source 304. Various other feeds, servers and sources may also be coupled to the content source 304 of FIG. 3.

The Internet 302 comprises a network of networks and is well known in the art. Communications over the Internet 302 can be accomplished using standard protocols such as transmission control protocol/internet protocol (TCP/IP), hypertext transfer protocol (HTTP), file transfer protocol (FTP), or other protocols. The Internet 302 is coupled to the plurality of distribution centers 306, and each distribution center 306 is in turn coupled to a plurality of client terminals 308, which may comprise a set top box, a PC, an interactive television set, or another type of communication device or display device.

In alternative or in addition to the Internet 302 being used to distribute multimedia content from the content sources 304 to distribution centers 306, communications channels or networks 320 apart from the Internet 302 may couple one or more content sources 304 to one or more distribution centers 306. A first dashed line 320 in FIG. 3 illustrates one example of such an alternate path for communications. Alternately or additionally, peering connections may exist between distribution centers 306. A second dashed line 322 in FIG. 3 illustrates one example of such peering. Other configurations are also possible and are included within the scope of the present invention.

Caches 310 may be provided at (or coupled to) the distribution centers 306. Such caches 310 may be used to increase the performance in the delivery of multimedia content to the client terminals 308. For example, larger files for video and other high bandwidth content may be stored in such caches 310, which may be closer to the client terminals 308 than to the content sources 304. In addition, reliability and guaranteed bandwidth may be provided because the Internet 302 is not in-between such caches 310 and the client terminals 308.

In accordance with one embodiment of the invention, different or multiple portals may be used to access the information provided through the interactive video casting system of FIG. 3, based on the type of client terminal being used by the end user. That is, for example, a television portal may be provided for an end user that uses a television set to access the information. A PC portal may be provided for an end user that uses a PC to access the information. Portals can be provided for end users that use cellular telephones, PDAs, audio devices, and the like to access the interactive video casting system 300 of FIG. 3.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the client terminal.

In another embodiment, a cable service provider or multiple system operator (MSO) can deliver signals having different formats to the various client terminals, with the client terminals not necessarily having special adapters. Therefore, as an example, the cable service provider or other party can generate/deliver information (e.g., television programming, web page content, and the like) having a format that is compatible for end users that receive the information via television sets. The cable service provider or other party can also generate/deliver the same information (e.g., simultaneously with the television portal on the same communication link, separately on a different communication link, on-demand independent of the television portal, and the like) using a format that is compatible with end users that receive the information via PCs, PDAs, cellular telephones, and the like. Thus, the term "interactive video casting system" is used to describe generally a system that can deliver video information over any network and any network-compatible device by broadcasting, multicasting, or unicasting. An "interactive television system" is one type of or one means of access to an "interactive video casting system."

Alternatively or in addition to a cable distribution system, a satellite television (TV) delivery system may be implemented. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to the head-end 306) may be used to gather programming content, ensure its digital quality, and transmit the signal up to the satellites. Programming may come to the broadcast center from content providers (TBS, HBO, CNN, ESPN, etc.) via satellite, fiber optic cable, and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

An embodiment of the invention provides a tool, in the form of a module comprising code or other machine-readable instructions that cause truncation of dynamic text strings at spaces. The text strings can comprise part of web page content, a feed, a resource retrieved from a storage location, or other content that can be provided for the system 300 via techniques familiar to those skilled in the art. In one embodiment of the invention, the code in the module can be stored (as JavaScript™ for instance) in a server along with the corresponding HTML page/file and/or text string. When the HTML file is retrieved by a browser of the client terminal 308, a copy of the code in the module can be sent along with the HTML file (or called by the browser when reading the HTML file). For instance, the HTML file may include HTML code to generate a template for the static portions of a particular web page. When dynamic portions of that web page (such as dynamic text strings) are to be retrieved into the template by the browser, the copy of the code in the module is read and executed by the browser to determine the nature of the truncation that needs to be performed on the incoming dynamic text strings. Hence, the module can be thought of as a "client-side tool" in such an embodiment since the code is executed at the client terminal 308. Next, the dynamic text strings are rendered by the browser according to the truncation performed or determined by the code.

The code in the module (including copies thereof) can be stored in machine-readable media suitably located anywhere in the system 300, such as locally in hard disk of the client terminal 308 for the embodiment described above. In various other embodiments, the code in the module may be stored in a more persistent nature at the client terminal 308 (e.g., as a plug-in that cooperates with the locally stored browser), or in a server at a distribution center 306 or other suitable location in the system 300. In these two other embodiments, the module acts upon incoming text strings (such as text strings in extensible markup language or XML format) to perform the truncation, and then provides the truncated text strings to a browser of a client terminal 308 for rendering.

In another embodiment, the module can be located in a server of a content provider (such as the source 304 or the image source 316) that provides the dynamic text string. In such an embodiment, the module performs the truncation on the text string prior to transmission of the text string to the client terminals 308. Therefore, the transmitted text string is already truncated appropriately for the client terminal 308 that will eventually receive it.

As mentioned above, various embodiments of the module can be stored as machine-readable instructions on one or more machine-readable media, suitably located in the system 300. It is to be appreciated that the term "machine-readable medium" is also intended to include carrier signals or information in transit, such as when a copy of the code in the module is sent along with an HTML file from a server to a client terminal 308.

Figures 4, 5:
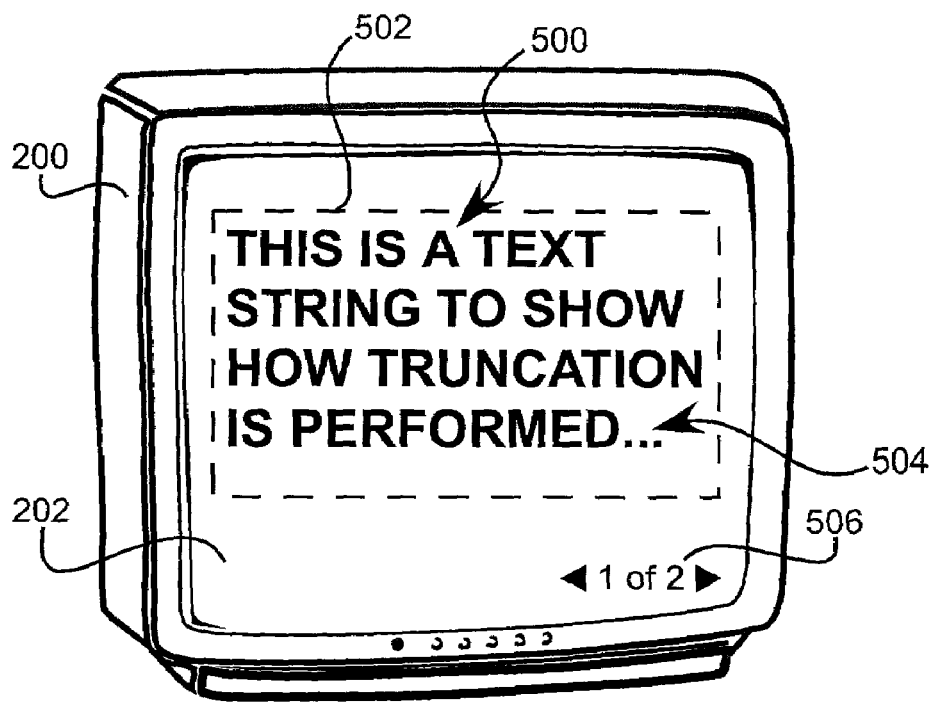
FIG. 4 is another example of a dynamic text string.
FIG. 5 illustrates truncation and display of the text string of FIG. 4 in accordance with an embodiment of the invention.

Referring next to FIG. 4, an example of a dynamic text string 400 is shown. For purposes of depiction, the text string 400 is illustrated in uppercase characters and in a specific font and font size. It is to be appreciated that the text string 400 can comprise any combination of alphanumeric characters, upper and lower case characters, font, font size, format (e.g., bold, italic, etc.), words and sentences, and so on. Moreover, it should be noted that while the text string 400 is shown in FIG. 4 as being broken into 3 separate lines of text, the text string 400 is, in general, a continuous unbroken string (unless, of course, hard carriage returns comprise part of the text string)—the breaks in the text string 400 in FIG. 4 are only for purposes of allowing the text string 400 to fit within the margins of that page in this patent application.

FIG. 5 illustrates truncation and display of the text string 400 of FIG. 4 in accordance with an embodiment of the invention. In FIG. 5, a portion (e.g., a substring 500) of the text string 400 is rendered in a container 502 of the display area 202 of the television 200. The container 502 can be thought of as a portion or real estate of the display area 202 that is designated for the display of dynamic text or other content. The container 502 can comprise one or more rows (or lines), with each row capable to display portions of the text string 400 or other content, including portions of other text strings. In the embodiment shown in FIG. 5, the container 502 is shown as displaying four rows that contain words from the text string 400. It is to be appreciated that the container 502 can have varying numbers of rows, depending on the particular UI designed for the client terminal 308 (e.g., the television 200 in FIG. 5) or depending on the particular web page to be displayed. For instance, a template for a particular web page may specify that only three rows of the container 502 are to be used for a heading, while the remaining rows of the container 502 are to be used for the body.

As can be seen in the substring 500 that is displayed in the container 502, the text string 400 is broken at spaces after the words "TEXT," "SHOW," and "TRUNCATION," rather than being broken within the words themselves, as in FIG. 2 above. Because the entire text string 400 does not fit in the container 502, an ellipsis 504 can be appended after the word "PERFORMED" in one embodiment. It is also noted that the ellipsis 504 is appended after the word "PERFORMED" where a space is normally positioned, thereby avoiding having to truncate the text string 400 somewhere within the word "PERFORMED."

If the user wishes to see the remainder of text string 400, the user can click on arrows of a page flipper control 506 or other visual indicator (such as a MORE button) in embodiments that have page flipper features that allow the user to move from page to page (or from "container to container"). The control 506 may also display the total number of pages available and the page number of the currently displayed page, such as with the "1 of 2" indicator shown for the control 506. Clicking on the arrows of the control 506 results in a display of another container that has another substring of the text string 400 and that can also be broken at spaces in a manner similar to that shown in FIG. 5. In such page flipper implementations, there is sufficient flexibility to design the code such that the ellipsis 504 may or may not be displayed at the end of each page where a truncation occurs. The use of multiple containers in a page flipper embodiment will be described in further detail later below.

In another embodiment, the substring 500 that is displayed (but truncated with the ellipsis 504) may not necessarily continue on to another page/container. In such an embodiment, sufficient amounts of the text string 400 may be displayed such that the user can fully understand the context of the text string 400 without needing to view the remainder, and so the remainder of the text string 400 is not made available for viewing.

Figure 6:
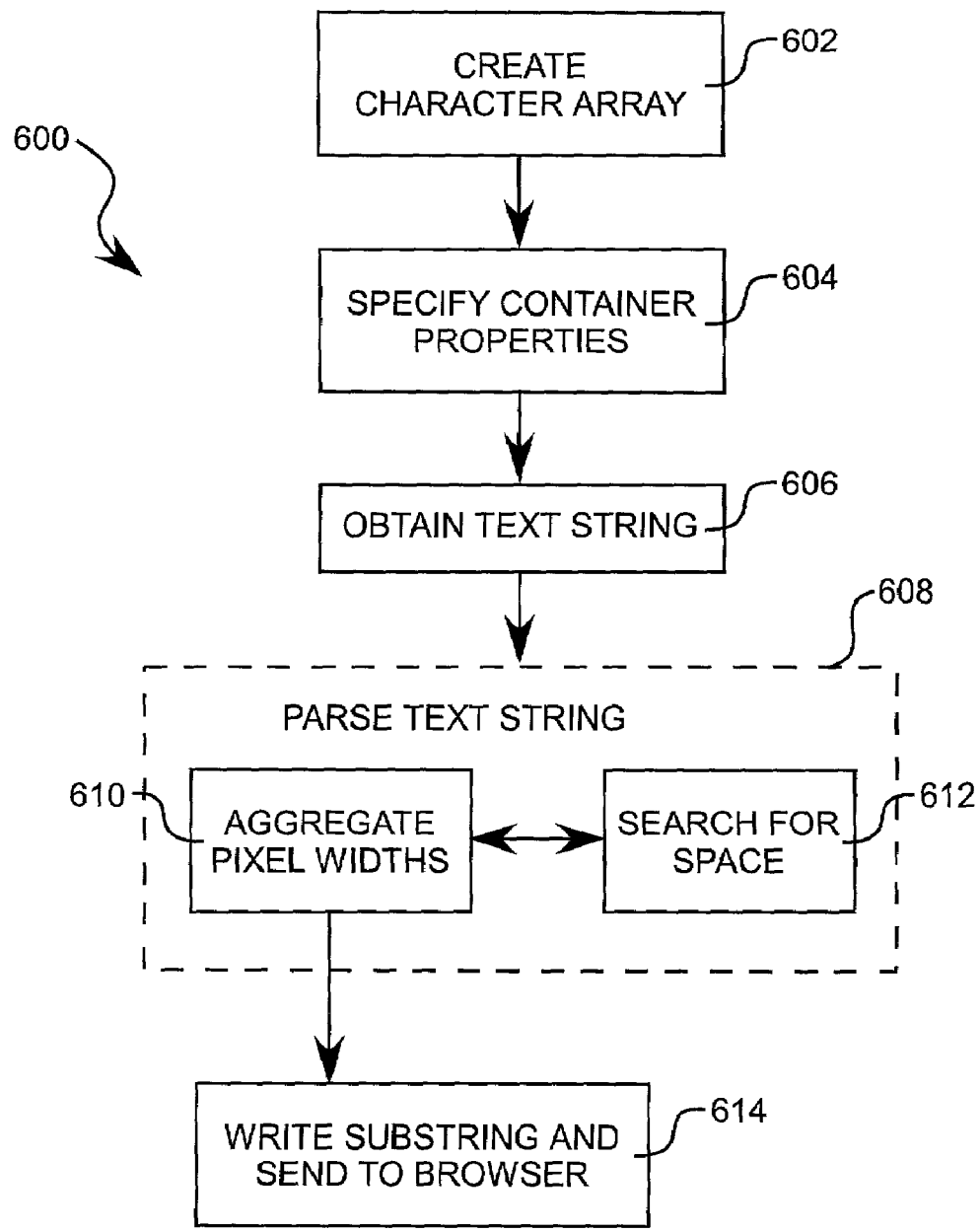
FIG. 6 is a flowchart illustrating operation of a module to truncate text strings, such as shown in FIG. 5, in accordance with one embodiment of the invention.

Referring next to FIG. 6, shown generally at 600 is a flowchart illustrating operation of a module to truncate text strings, in a manner such as that shown in FIG. 5, in accordance with one embodiment of the invention. A specific example of JavaScript™ code, for illustrative purposes, that can implement the operations shown in the flowchart 600 is disclosed in the provisional patent application identified above. Beginning at a block 602, a UI developer creates a character array or library. Such an array can be included within the code itself, or it may be present elsewhere (such as in a separate server database or other storage location) such that the code can access the array to obtain/check array values.

In an embodiment of the invention, the array values in the character array created at the block 602 comprise pixel widths of characters, based on font metrics (e.g., font, font size, and treatment such as bold, italic, etc.) for each possible font that can be used. For instance, an array can be created for Arial 18 point regular by first specifying a variable var chars=new Array( ) in JavaScript™, and then populating the Array( ) with pixel width values for each character. Thus, chars['T' ]=new Chars(11) in the array specifies that uppercase T in Arial 18 point regular has a pixel width of 11 pixels. A new Chars( ) value for pixel widths can be created for every character, including a space and an ellipsis.

In an embodiment, a font width library referenced by the decimal equivalent of the regular Latin subset of Unicode can be created at the block 602. For systems that do not support the charCodeAt( ) JavaScript™ method to do this (it is noted that this method is also one mechanism to communicate ASCII characters like carriage returns and new lines that occur in a dynamically generated string to the browser), a character array may be used/created at the block 602.

At a block 604, the UI developer specifies container properties. It is noted that the block 604 need not necessarily be performed subsequent to the block 602, and may be performed prior to or concurrently with the block 602. At the block 604, the container properties that can be specified include, but are not limited to, variables var divWidth=width in number of pixels of the container (with this pixel width capable of being allocated or otherwise set), var ttlRow=number of lines/rows in the container, and var textString=a variable that references the text feed (e.g., the text string 400 to be written), where a variable textString.length is set as the pixel length of the entire text string.

Next at a block 606, a text string (such as the text string 400) is obtained. As mentioned above, the text string may be obtained according to any number of known techniques, such as via a feed, as part of an HTML file, retrieved from a server, and so on. It is further understood that by the time the block 606 is reached, the text string had already been previously created by a web developer/designer, content provider, or other entity or individual.

At a block 608, the text string is parsed. The parsing may be performed by a JavaScript™ parser, for instance, or by other parser in the module. More specifically, the parsing at the block 610 includes aggregation of pixel widths at a block 610 to determine if the sum of pixel widths of each continuing portion of the text string fits within the container 502 (e.g., fits within the limits set by divWidth) for each row. If or when the sum of pixel widths exceeds divWidth for a given row, such as when an offending character is detected, then a search through the previous portion of the text string is performed at a block 608 to locate the previous immediate space.

The text string is then broken or truncated at that space, and the operations at the block 610 repeat for the next row, with the first character in that next row being the first character from the word having the offending character from the previous row. This iteration between the aggregation of pixel widths for each row and back-searching for a space in each row is shown symbolically in FIG. 6 by a double arrowhead between the blocks 610 and 612. At a block 614, the code writes the text string, or otherwise provides the text string having the truncations at the spaces to the browser for eventual display to the user in one embodiment. In another embodiment, the substrings that are broken at the spaces are written or provided to the browser one row at a time at the block 614.

Figure 7:
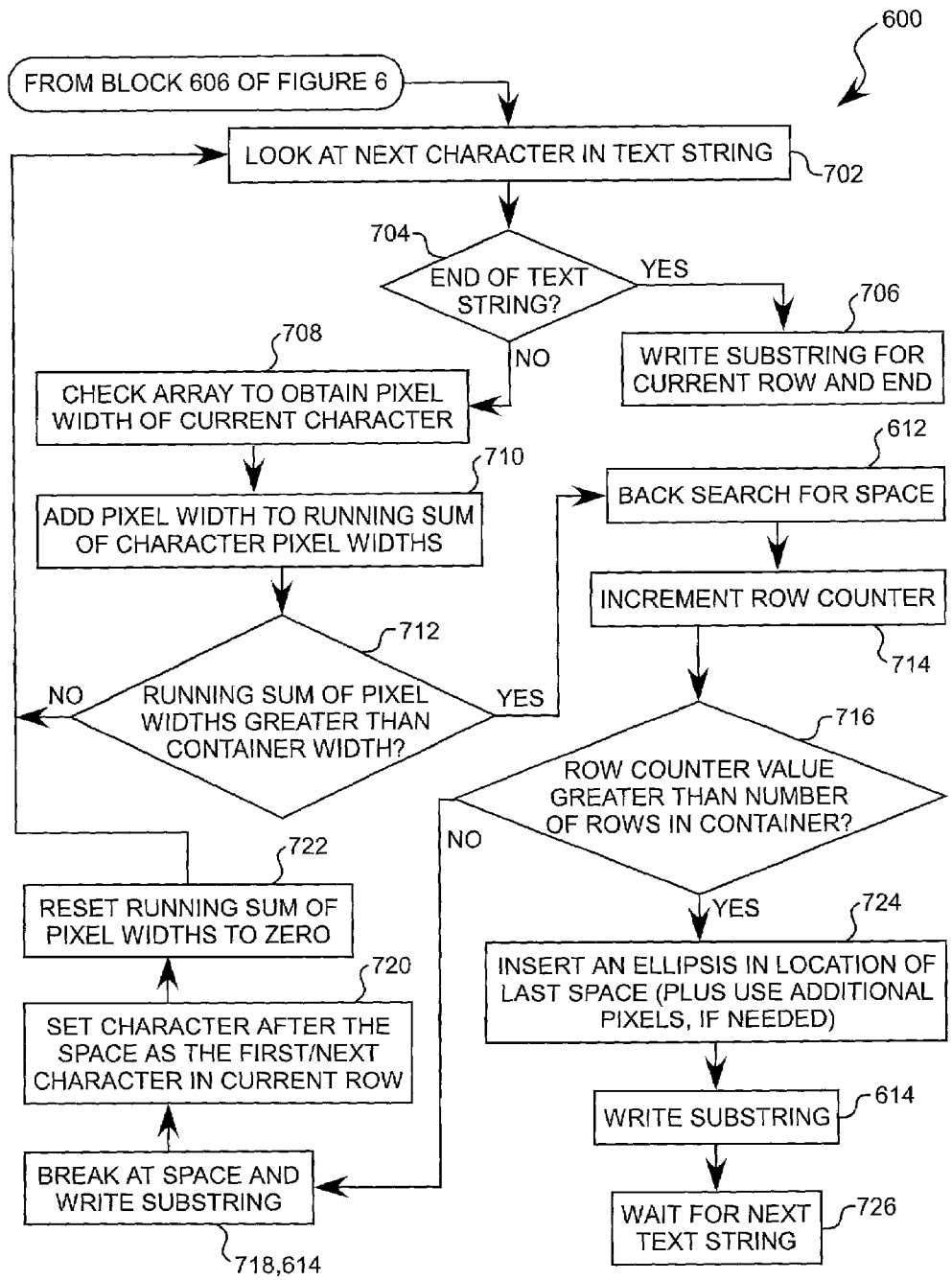
FIG. 7 is a flowchart illustrating a subroutine for the module of FIG. 6 to aggregate pixel widths of characters in accordance with an embodiment of the invention.

FIG. 7 is a flowchart illustrating operation of the subroutine of the block 610 of FIG. 6 to aggregate pixel widths of characters in accordance with an embodiment of the invention. The subroutine of the block 610 may be invoked via a function call, in one embodiment, as in a findFit(n) subroutine/function that is called and described in the source code in the provisional patent application, where n=the index of the text string's character at which the function will begin to measure the pixel width. For instance, n=0 initially for the first character (an indexed string begins with 0 as the first element in one embodiment); n=1 for the second character in the string; n=2 for the third character; and so on, such that findFit(n) is executed in an iterative loop for successive characters in the text string.

For purposes of simplicity of explanation, the subroutine shown in FIG. 7 (as well as what is shown in the other flowcharts) will be described herein via pseudo-code or at a high level. A person skilled in the art can write code based on what is shown and described herein, or can refer directly to the source code disclosed in the provisional application for specific syntax. Beginning at a block 702, the code looks at the "next" character in the text string. Initially, the "next" character is the first character in the text string (and the current row value in a row counter is set at the first row) and is set as the current character, and in subsequent iterations through the loop, the "next" character is each succeeding character in the text string.

Next at a decision block 704, a determination is made whether the current character is at the end of the text string. If it is last character in the text string, then the substring on that current row is written at a block 706 or otherwise provided to the browser. Since there are not more characters in the text string, the subroutine to perform a back search for a space at the block 612 is not (and will never be) called in an embodiment.

If at the block 704, however, the current character is not the last character in the text string, then the code proceeds to a block 708 to obtain the pixel width of that character. In one embodiment, this involves a lookup to the Array( ) or to a library to obtain the pixel width c of that character. For instance, in one embodiment, the current character may be identified with an index (such as an integer) when it is in the text string, and then, this index is used as a reference to look for a value in the Array( ) that corresponds to that index. Next at a block 710, the pixel width c is added to a running sum of character pixel widths, such as a variable charSum for instance.

At a decision block 712, the value of the running sum charSum is compared with the value of the container width divWidth, so as to determine if the current character is an offending character that will exceed the right boundary of the container. If the value of charSum is not greater than the value of divWidth (e.g., there is still room in that row for additional characters), then n is incremented to the next character and the code loops back to the block 702 to analyze that next character in a manner described above.

If charSum is greater than divWidth at the block 712, however, then that signifies that the current character is an offending character. If this is the case, then a function call to a subroutine at the block 612, such as to a subroutine called backSearch(start), is made in order to back search for a previous/last immediate space in the text string. A more detailed description of such a back search subroutine will be provided later with respect to FIG. 8. It is to be appreciated that in one embodiment, some or all of the operations that will be described in the next blocks 714–722 can comprise part of the back search subroutine.

After the last space is located at the block 612, then the row counter is incremented at a block 714. At a decision block 716, the new value in the row counter is compared with the preset value of ttlRow (e.g., the total number of rows in the container). If the value in the row counter is less than ttlRow (signifying that the current row is not the last row and that additional rows are available to write characters), then the text string is broken at a block 718 at the space previously found at the block 612, and the code moves to the next row in the container. It is noted that at the block 718 in one embodiment, the code can write or provide the broken substring to the browser at that point so that the browser may render the characters from that substring without having to wait for the remaining substrings, or in another embodiment, the code can aggregate the broken substrings and provide (or write) them all at once to the browser.

Continuing from the block 718, the code then sets the character after the space (from the previous row) as the first/next character in the current row at the block 720 (e.g., passes an index corresponding to this character back into the loop, via incrementing of an index corresponding to the space by 1 to move the current index to that of the character after the space). This operation at the block 720 to set the character after the space as the first character in the current row is performed so that the first character in each subsequent row (after a break at a space in a previous row has occurred) does not begin with a space. At a block 722, the running sum charSum of pixel widths is reset to zero, so that a new running sum for that row can be created, and the code loops back to the block 702 to repeat the operations described above for the characters that are to be written into the current row.

If, however, the code determines back at the block 716 that the row counter value is equal to or greater than the value of ttlRow (signifying that the current row is the last row in the container), then the subroutine proceeds to a block 724. At the block 724, the code inserts an ellipsis adjacent to or in the location where the space was located (e.g., the space is over-written by the ellipsis immediately after the last character prior to the space, or the ellipsis is appended immediately after the space) and truncates the remainder of the text string. In one embodiment, the pixel length of the ellipsis can be identical to the pixel length of the space, such that insertion of the ellipsis at the block 724 involves simply replacing the space with the ellipsis in the substring. In embodiments where the pixel length of the ellipsis is greater than the pixel length of the space, the ellipsis is inserted in the location of the space plus in at least a part of the location that would have been occupied by the character subsequent to the space. This may be done, for instance, by decrementing divWidth until sufficient room is available for the ellipsis.

Next at the block 614, the substring for that last row (with the ellipsis) is written or otherwise provided to the browser. In one embodiment, the module ends at the block 614 after the text string is truncated with the ellipsis, and the module waits for the next text string to arrive at a block 726. In another embodiment that will be described later below with regards to FIGS. 9–10, the truncation at the end of the current container (whether with or without an ellipsis) results in generation of additional container(s) to display additional substring(s) of the text string, such as with a page flipper implementation.

Figure 8:
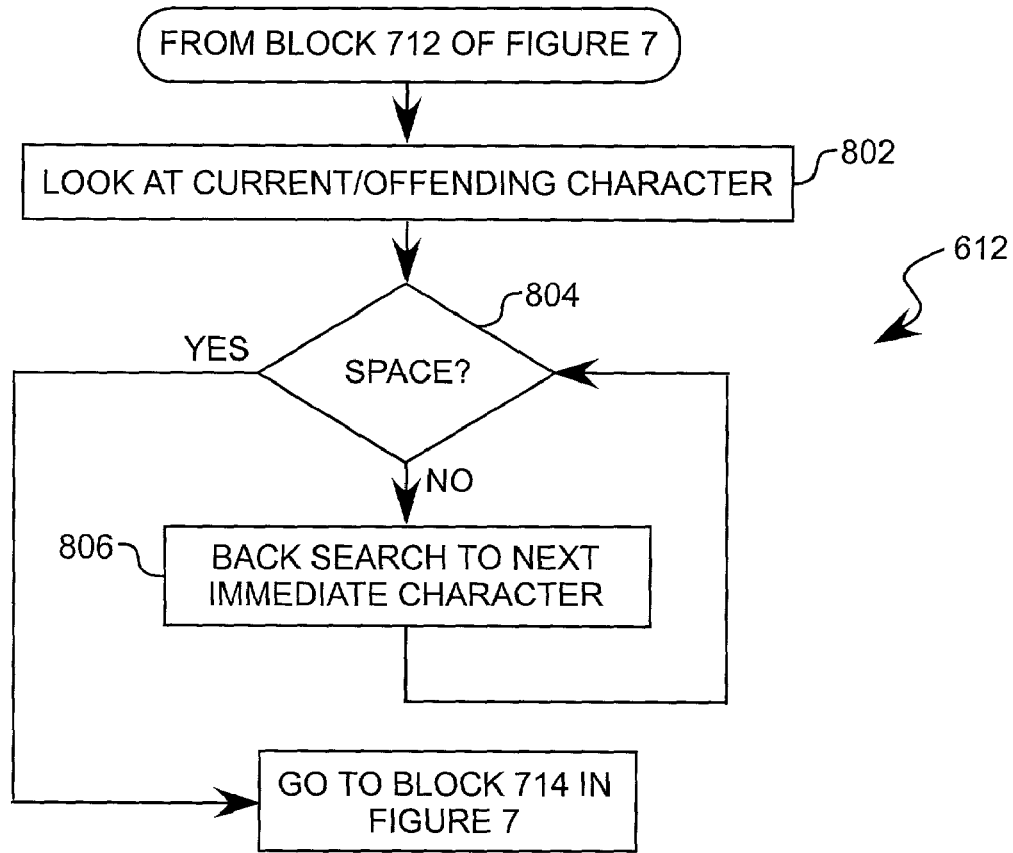
FIG. 8 is a flowchart illustrating a subroutine for the module of FIG. 6 to search for a space in a text string in accordance with an embodiment of the invention.

FIG. 8 is a flowchart illustrating a subroutine represented by the block 612 for the module of FIG. 6, such as the backSearch(start) function, to search for a space in the text string in accordance with an embodiment of the invention. Beginning at a block 802 (which may flow after the block 712 of FIG. 7), the code looks at the offending character (e.g., the current character whose pixel width caused charSum to exceed divWidth at the block 702).

As mentioned above, the offending character may be referenced by an index number i in one embodiment. Hence at a decision block 804, the code consults the Array( ) or a library to determine if an entry in the array/library that corresponds to this index number is that of a space. If the index number of the current character corresponds to an index number for a space in the array/library, then this signifies that the text string may be broken or have an ellipsis appended at that point. Therefore, in the embodiment shown in FIG. 8, the subroutine proceeds to the block 714 in FIG. 7 to determine if the text string is to be broken so as to move to the next row, or if the ellipsis is to be appended.

If the index number does not correspond to that of a space in the block 804, then the code proceeds to a block 806 to back search to the next immediate character (e.g., to the character previous to the offending character). The index number of that character is obtained and compared with indexes in the array, at the block 804, to determine whether that character is a space. The process subsequently iterates if that character is not a space.

Figure 9:
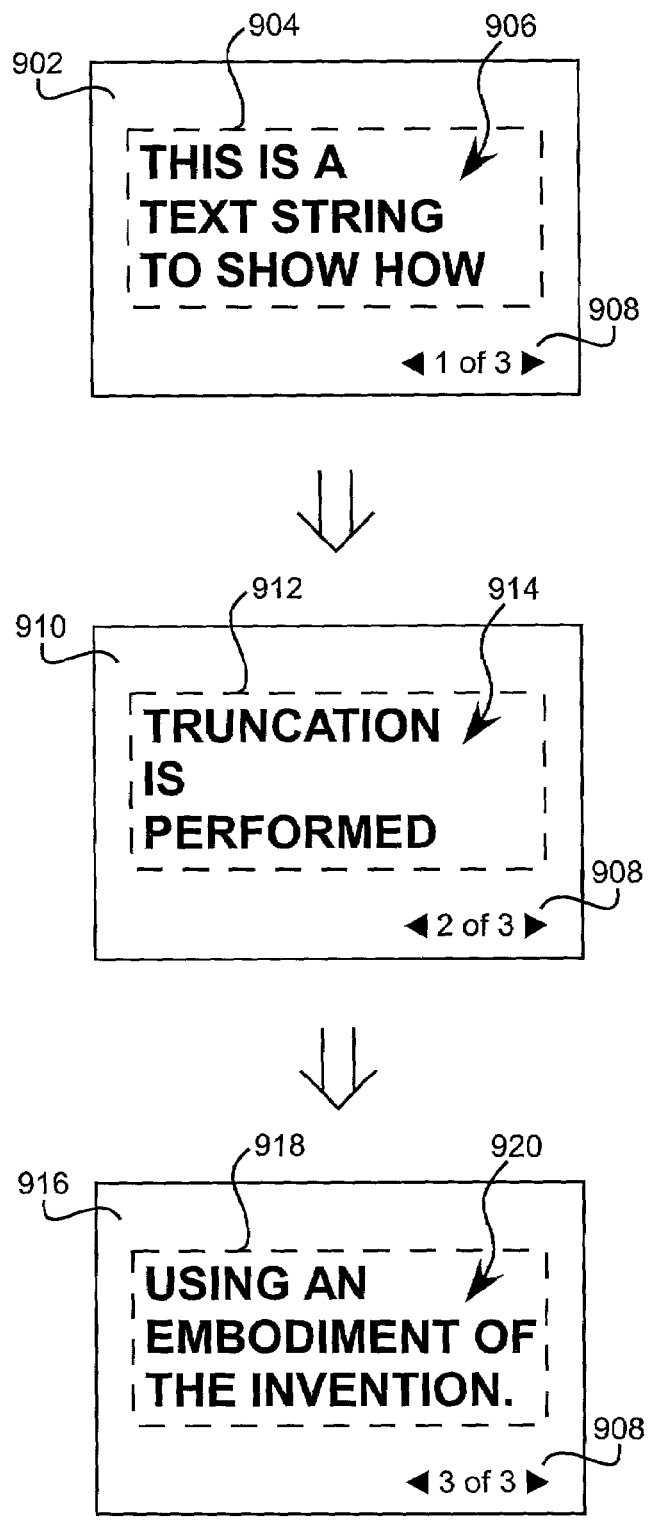
FIG. 9 illustrates example UI displays in accordance with a page flipper embodiment of the invention.

FIG. 9 illustrates example UI displays in accordance with a page flipper embodiment of the invention, which for instance, can be used to display the text string 400 of FIG. 4. At a first page 902, a container 904 has rendered in it a substring 906 of the text string 400. As shown, the substring 906 breaks at a space near the end of each row (and hence, the substring 906 itself is broken into substrings). An ellipsis may or may not be present (as in FIG. 9) at the end of the substring 906 at the last row, according to various embodiments. A page flipper control 908 indicates that the page 902 is the first of 3 available pages, and the viewer can click on the control 908 to page to other pages.

In a similar manner, a second page 910 includes another container 912 that has rendered in it a subsequent substring 914 from the text string 400. As before, the substring 914 is broken at spaces near the end of each row, and may or may not have an ellipsis near the end of the last row. The control 908 now indicates that the page 910 is the second of 3 available pages, and also provides the user with paging capability.

In a third page 916, a container 918 has rendered in it a final substring 920 of the text string 400. In the example shown, the length of the substring 920 is sufficiently sized so that it does fit into the container 918, with the control 908 indicating that the last page has been reached. It is to be appreciated that if the substring 920 did not fit in the container 918, additional pages may be made available and/or the substring 920 may be truncated at the last row with an ellipsis, according to various embodiments.

Figure 10:
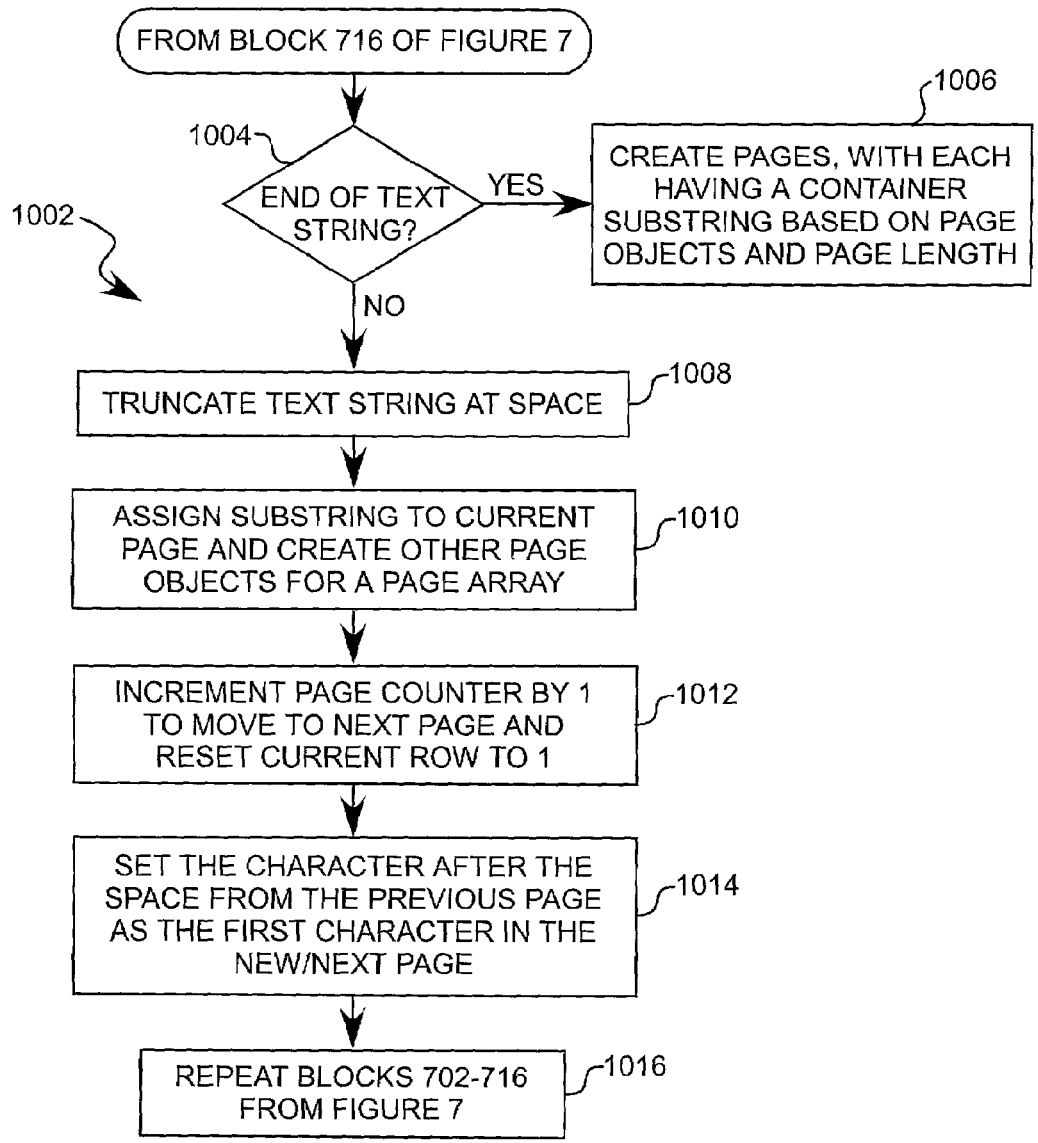
FIG. 10 is a flowchart illustrating a subroutine for a page flipper implementation that can be used to provide the UI displays of FIG. 9 in accordance with an embodiment of the invention.

Referring next to FIG. 10, shown generally at 1002 is a flowchart illustrating a subroutine for a page flipper implementation that can be used to provide the UI displays of FIG. 9 in accordance with an embodiment of the invention. In one embodiment, the flowchart 1002 can flow from the block 716 of FIG. 7, as shown in FIG. 10. In embodiments where subsequent text strings are to be placed in subsequent page containers (rather than complete truncation of the text string after the first container). Thus, the subroutine of the flowchart 1002 is called when it is determined at the block 716 that the last row in the current container has been reached.

First at a decision block 1004, the subroutine checks if the end of the text string has been reached. If the end of the text string has been reached, then the subroutine flows to a block 1006 to write the substrings for each page container (as well as to generate the pages), which will be described later below. If, however, the end of the text string is determined to have not been reached at the block 1004, then the text string is truncated (e.g., split) at a space at a block 1008 on the last row of the first page. As stated previously, an ellipsis may or may not be appended at that location.

At a block 1010, that substring is assigned to the current page. In one embodiment, this may be done via a variable textBlock[currPage], where the argument currPage stands for the current page and is set to 0 for the first page. At the block 1010, other page objects for an array Page( ) may also be created. Thus, textBlock[0] is a first page object for the Page( ) array, with other page objects corresponding to that first page, which is identified by Page(0) in the array, including text properties (e.g., font, font size, and the like), current page number or current container, and so on.

At a block 1012, a page counter is incremented by 1 to move to the next page or container. The current row is also reset to 1, so that the pixel width aggregation process can begin at the top of the new container for the next page. At a block 1014, the current character is designated as the character after the space, such as by incrementing a string index s by 1 (e.g., s+1) and using s+1 as the argument for the findFit(n) function. Then the operations at the blocks 702–716 of FIG. 7 repeat to aggregate pixel widths and break the text strings at spaces at the end of each row.

After the operation at the block 716 is performed during each iteration, the code determines at the decision block 1004 whether the end of the text string has been reached. If it has been reached, then at the block 1006, the code creates pages, with each page having a container substring based on page objects and page length. That is, in one embodiment once the end of the text string has been reached at the block 1004, the code goes back to the Page( ) array for each page object. The code obtains the text block[ ] for each page and the associated text properties for that page. The code also obtains the page length (e.g., the value of the page counter signifying the number of pages needed to render the entire string).

In an embodiment, HTML code is then dynamically written at the block 1006 to accommodate as many containers as specified by the page length. Subsequently, the substrings are written on each page or otherwise provided to the browser for rendering, including the page flipper controls 908.

One embodiment of the invention provides an enhancement to the page flipper implementation. With this embodiment of the enhancement, more control is provided over individual text formatting. Thus, header text may be combined with formatted text (e.g., bold, italic, color, column layout, and so on), along with lengthy text strings, from multiple feeds. As an example, traffic reports from different counties may be provided as a header (in a particular color) identifying the county, date of the report positioned in a column under the header, and a textual description of the traffic conditions under the date and continued on multiple pages via the page flipper process described above. A different report according to this layout can be sequentially provided on each page or portion thereof, separated by blank lines or carriage returns.

In an embodiment, multiple feeds are parsed to identify header, date, textual description, and other objects, and these are placed in an array. The formatting may be stored in a database, and represented by HTML markup in the code and retrieved, line by line, as needed. In one embodiment, this enhancement assumes that some, but not necessarily all, of the parts (e.g., the heading, the label, the summary, or other specific elements that are common to all groupings of information are the "parts") require either truncation or accommodation for multiple lines within a page flipper.

For instance, refer to the following scenario with its applicable business requirements: Traffic reports include a "region," a "date," and a brief description of the traffic condition. The heading should be bold, and have a prominently colored font treatment (perhaps yellow text), as an example. The date can be plain text. The description should always start on its own line after the date, and may run more than one line, in an embodiment. A region and or a date should never be on one page while the description is on the next page. Likewise, the region should not repeat if it is the second or subsequent item in a list of items occurring at that region, unless it is the top item on a new page. All items should have a full blank line between them, and there should never be a blank line by itself at the top of a page.

The findFit( ) function places each measured line, guaranteed to fit within one line of a specified pixel width, in an indexed array, a property of a "Traffic" object called "descLines." Each traffic item is captured as an object, an instance of the Traffic class, named "trafficItems[index]" with properties region, date, desc, and descLines. Therefore, referencing trafficItems[2].desc yields the third traffic item's description or summary. In this way, each trafficItems is accounted for, line by line, in order to build the layers of containers that will hold all of the text in a page flipper.

In this example embodiment, only the description requires accommodation for more than one line, but in other embodiments, multiple parts may require truncation and multiple lines may need accommodation, or a combination of both. A function "bigLines" is responsible for holding the formatted lines of text that will be displayed. Each indexed line of bigLines is one line of text guaranteed to fit inside the specified pixel width and number of allowable lines in the page flipper. Since each part is parsed in a predictable order by bigLines, an embodiment adds any necessary markup and text treatment to the line of text, including line breaks between items. The code in the body of the page that creates the Page( ) objects uses an algorithm to keep track of how many lines go into each Page( ), and that it is exactly what is allowed by ttlRow.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while a client-side embodiment has been described herein where the parsing of the text string occurs at the client terminals 308, it is to be appreciated that the parsing may occur in other locations in another embodiment. For instance, a server-side implementation may be used where server software or modules perform the parsing of text strings prior to providing the text strings to the client terminals 308. In such cases, therefore, the client terminals 308 receive text strings that are already broken or truncated. Scripting languages like tool command language (TCL) or job control language (JCL) may be used in such embodiments to gather necessary information about font and UI container properties from the client.

Moreover, although embodiments have been described above with reference to HTML implementations for the purpose of illustration, other implementations can support an embodiment of the invention. For instance, non-HTML implementations for Flash, in addition to HTML text implementations, may be incorporated in an embodiment of the invention. Such an embodiment of the modified truncation tool can be designed for Flash using Action Script, for instance. Flash can, in addition, import strings of text from a text file. As described above, server-side versions of this truncation code can be provided in both Java™ and TCL. These server-side applications may be used to create a text file that Flash can then be able to import.

In another embodiment with a modification, such an embodiment performs differently than counting backward to the prior empty space and inserting a line break into the text, and then overflowing to a new page of text (which may amount to a "widowed" line on that next page). By adjusting the "leading" and inter-character spacing, the characters on the last line or the last two lines can be "squeezed" by an embodiment of the tool to prevent the characters from being widowed on a new page. Systems or tools that support or have the capability to adjust the leading of text can implement this embodiment of the invention.

In yet another embodiment with a modification, a second parameter (a character's height in pixels) can be added to the font class to enable the tool to determine on its own how many lines of text can fit inside of a particular UI container with x pixels of total height.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. In an interactive television environment, a method comprising:
   aggregating pixel widths of a portion of a text string for a row in a display area having at least one row;
   if the aggregated pixel widths for that row exceed a width of the row, searching back through characters of the portion of the text string until a space is located;
   breaking the portion of the text string at the located space; and
   if aggregated pixel widths for a last row of the display area exceed an allocated pixel width for the last row, truncating a portion of the text string for that last row at a space, comprising:
      if the aggregated pixel widths of the portion of the text string for that last row exceed the allocated pixel width of the last row, searching back through characters of that portion of the text string until the space is located; and
      inserting an ellipsis in a location immediately adjacent to the location of the space.

2. The method of claim 1 wherein inserting the ellipsis in the location immediately adjacent to the location of the space includes inserting the ellipsis in place of the space.

3. The method of claim 1 wherein searching back through characters of the portion of the text string until the space is located comprises comparing an index of each of the characters with array values until an array value corresponding to an index of the space is located.

4. The method of claim 1 wherein aggregating pixel widths of the portion of the text string includes obtaining pixel width values of characters in the portion from an array and summing the obtained pixel width values.

5. The method of claim 1, further comprising:
   incrementing to a next row; and
   for that next row, repeating the aggregating pixel widths, searching until a space is located, and breaking at the located space.

6. The method of claim 5, further comprising advancing an index corresponding to the located space of any row by 1 to allow a subsequent portion of the text string for the next row to begin with a character different from the space.

7. The method of claim 1, further comprising providing the portion of the text string broken at the located space, and the portion of the text string truncated at the last row, to a browser.

8. The method of claim 7 wherein the portion of the text string broken at the located space is provided separately to the browser than the portion of the text string truncated at the last row.

9. The method of claim 1 wherein the display area comprises part of a page and wherein the portions of the text string on the page comprise a substring, the method further including:
   creating additional pages to each fit an additional substring of the text string;
   breaking a portion of each substring at a last row of each page at a space; and
   providing a control to allow movement from one page to another.

10. The method of claim 9 wherein creating additional pages to each fit an additional substring comprises:
    creating a page array that tracks a number of pages;
    for the page array, creating page objects having a property that specifies the substring that fits inside a particular page; and
    generating the pages that fit the substrings specified by the property based on the page objects and based on a number of pages counted from the page array.

11. The method of claim 9, further comprising setting a character after a space from a previous page as a first character in a subsequent page.

12. The method of claim 9, further comprising controlling format of the text string from one page to another.

13. An article of manufacture, comprising:
    a machine-readable medium usable in an interactive television environment and having stored thereon instructions to:
    aggregate pixel widths of a portion of a text string for a row in a display area having at least one row;
    if the aggregated pixel widths for that row exceed a width of the row, search back through characters of the portion of the text string until a space is located;
    break the portion of the text string at the located space; and
    if aggregated pixel widths for a last row of the display area exceed an allocated pixel width for the last row, truncate a portion of the text string for that last row at a space, comprising:
       if the aggregated pixel widths of the portion of the text string for that last row exceed the allocated pixel width of the last row, search back through characters of that portion of the text string until the space is located; and insert an ellipsis in a location immediately adjacent to the location of the space.

14. The article of manufacture of claim 13 wherein the machine-readable medium further includes instructions stored thereon to advance an index corresponding to the located space of any row by 1 to allow a subsequent portion of the text string for a next row to begin with a character different from the space.

15. The article of manufacture of claim 13 wherein the display area comprises part of a page and wherein the portions of the text string on the page comprise a substring, the machine-readable medium further including instructions stored thereon to:
create additional pages to each fit an additional substring of the text string;
break a portion of each substring at a last row of each page at a space; and
provide a control to allow movement from one page to another.

16. The article of manufacture of claim 15 wherein the machine-readable medium further includes instructions stored thereon to control format of substrings from one page to another.

17. An interactive television system, comprising:
a means for aggregating pixel widths of a portion of a text string for a row in a display area having at least one row;
a means for searching back through characters of the portion of the text string until a space is located, if the aggregated pixel widths for that row exceed a width of the row;
a means for breaking the portion of the text string at the located space; and
a means for truncating a portion of the text string for a last row of the display area at a space, if aggregated pixel widths for the last row exceed an allocated pixel width for the last row, wherein the means for truncating a portion of the text string includes:
a means for searching back through characters of that portion of the text string until the space is located, if the aggregated pixel widths of the portion of the text string for that last row exceed the allocated pixel width of the last row; and
a means for inserting an ellipsis in a location immediately adjacent to the location of the space.

18. The system of claim 17 wherein the display area comprises part of a page and wherein the portions of the text string on the page comprise a substring, the system further including:
a means for creating additional pages to each fit an additional substring of the text string;
a means for breaking a portion of each substring at a last row of each page at a space; and
a means for providing a control to allow movement from one page to another.

19. The system of claim 18, further comprising a means for controlling format of substrings from one page to another.

20. In an interactive television environment, a method comprising:
aggregating pixel widths of a portion of a text string for a row in a page having at least one row;
if the aggregated pixel widths for that row exceed a width of the row, searching back through characters of the portion of the text string until a space is located;
breaking the portion of the text string at the located space;
if aggregated pixel widths for a last row of the page exceed an allocated pixel width for the last row, truncating a portion of the text string for that last row at a space, wherein the portions of the text string on the page together comprise a substring of the text string;
creating additional pages to each fit a subsequent substring of the text string; and
breaking a portion of each subsequent substring at a last row of each page at a space.

21. The method of claim 20 wherein creating additional pages to each fit a subsequent substring comprises:
creating a page array that tracks a number of pages;
for the page array, creating page objects having a property that specifies the substring that fits inside a particular page; and
generating the pages that fit the substrings specified by the property based on the page objects and based on a number of pages counted from the page array.

22. The method of claim 21, further comprising controlling format of the substrings from one page to another.

23. An article of manufacture, comprising:
a machine-readable medium usable in an interactive television system and having instructions stored thereon to:
aggregate pixel widths of a portion of a text string for a row in a page having at least one row;
search back through characters of the portion of the text string until a space is located, if the aggregated pixel widths for that row exceed a width of the row;
break the portion of the text string at the located space;
truncate a portion of the text string for a last row of the page at a space, if aggregated pixel widths for the last row exceed an allocated pixel width for the last row, wherein the portions of the text string on the page together comprise a substring of the text string;
create additional pages to each fit a subsequent substring of the text string; and
break a portion of each subsequent substring at a last row of each page at a space.

24. The article of manufacture of claim 23 wherein the instructions to create additional pages to each fit a subsequent substring comprise instructions to:
create a page array that tracks a number of pages;
for the page array, create page objects having a property that specifies the substring that fits inside a particular page; and
generate the pages that fit the substrings specified by the property based on the page objects and based on a number of pages counted from the page array.

25. The article of manufacture of claim 23 wherein the machine-readable medium further includes instructions stored thereon to control the format of the substrings from one page to another.

26. An interactive television system, comprising:
a means for aggregating pixel widths of a portion of a text string for a row in a page having at least one row;
a means for searching back through characters of the portion of the text string until a space is located, if the aggregated pixel widths for that row exceed a width of the row;
a means for breaking the portion of the text string at the located space
a means for truncating a portion of the text string for a last row of the page at a space, if aggregated pixel widths for the last row exceed an allocated pixel width for the last row, wherein the portions of the text string on the page together comprise a substring of the text string;

a means for creating additional pages to each fit a subsequent substring of the text string; and a means for breaking a portion of each subsequent substring at a last row of each page at a space.

27. The system of claim 26 wherein the means for creating additional pages to each fit a subsequent substring comprises:

a means for creating a page array that tracks a number of pages;

for the page array, a means for creating page objects having a property that specifies the substring that fits inside a particular page; and a means for generating the pages that fit the substrings specified by the property based on the page objects and based on a number of pages counted from the page array.

* * * * *